United States Patent
Hoellriegl et al.

(10) Patent No.: US 9,969,117 B2
(45) Date of Patent: May 15, 2018

(54) TRANSPORT DEVICE AND METHOD FOR TRANSPORTING PLASTIC CONTAINERS OR PREFORMS

(71) Applicant: Krones AG, Neutraubling (DE)

(72) Inventors: Thomas Hoellriegl, Teublitz (DE); Harald Effenberger, Schierling (DE)

(73) Assignee: Krones AG, Neutraubling (DE)

( * ) Notice: Subject to any disclaimer, the term of this patent is extended or adjusted under 35 U.S.C. 154(b) by 816 days.

(21) Appl. No.: 14/482,494

(22) Filed: Sep. 10, 2014

(65) Prior Publication Data

US 2015/0069670 A1    Mar. 12, 2015

(30) Foreign Application Priority Data

Sep. 12, 2013 (DE) .................. 10 2013 218 337

(51) Int. Cl.
*B29C 49/42* (2006.01)
*B29C 49/36* (2006.01)
(Continued)

(52) U.S. Cl.
CPC .......... *B29C 49/4205* (2013.01); *B29C 49/36* (2013.01); *B29C 49/421* (2013.01);
(Continued)

(58) Field of Classification Search
None
See application file for complete search history.

(56) References Cited

U.S. PATENT DOCUMENTS 3,469,893 A    9/1969 Hudson
3,648,854 A    3/1972 Potter
(Continued)

FOREIGN PATENT DOCUMENTS

DE    4025011 A1    2/1992
DE    10 2005 051 914 A1    5/2007
(Continued)

OTHER PUBLICATIONS

European Search Report for EP 14 17 9998 dated Feb. 2, 2015.
German Search Report for DE 10 2013 218 337.2 dated Jun. 3, 2014.

*Primary Examiner* — Monica Huson
(74) *Attorney, Agent, or Firm* — Steven M. Shape; Dennemeyer & Associates, LLC

(57) ABSTRACT

Disclosed are a device for reshaping preforms to plastic containers (2), a transport device (1), as well as a method for transporting plastic containers (2) or preforms. The device (100) for reshaping preforms into plastic containers (2) comprises at least two blow moulds (81) in which the preforms are expanded into plastic containers, arranged on a circumferentially driven blowing wheel (80), a heater (50) for heating the preforms, and a transport device (1) for the plastic containers (2) or preforms. The transport device (1) comprises a motor drive (5) having a drive shaft (15) that drives a support (17) with at least two gripping and/or support elements (4) for the respective plastic containers (2) or preforms to be transported in a rotary fashion, wherein the gripping and/or support elements (4) are mounted with a linear bearing (21) so as to be movable relative to the support, wherein the linear bearing has at least one rail, which is surrounded at least in sections by a cage (71), and that a plurality of rollers (72), in particular more than 50 rollers, which roll on the rail (73), is arranged in the cage (71).

12 Claims, 13 Drawing Sheets

(51) Int. Cl.
  *B29C 49/46*    (2006.01)
  *B29C 49/64*    (2006.01)
  *F16C 33/44*    (2006.01)
  B29C 49/38    (2006.01)
  B65G 47/86    (2006.01)

(52) U.S. Cl.
  CPC .......... *B29C 49/4252* (2013.01); *B29C 49/46* (2013.01); *B29C 49/6409* (2013.01); *F16C 33/44* (2013.01); *B29C 49/38* (2013.01); *B29C 2049/4697* (2013.01); *B29K 2871/00* (2013.01); *B29K 2995/0058* (2013.01); *B65G 47/847* (2013.01)

(56) References Cited

U.S. PATENT DOCUMENTS

| | | |
|---|---|---|
| 5,156,462 A | 10/1992 | Jacob et al. |
| 8,678,172 B2 | 3/2014 | Voth |
| 8,807,330 B2 | 8/2014 | Kraus |
| 2012/0321741 A1 | 12/2012 | Voth et al. |
| 2014/0251754 A1 | 9/2014 | Hoellriegl et al. |

FOREIGN PATENT DOCUMENTS

| | | |
|---|---|---|
| DE | 20 2013 101048 U1 | 5/2013 |
| DE | 10 2012 221 804 A1 | 5/2014 |
| EP | 2 388 196 A1 | 4/2011 |
| EP | 2388196 A1 | 11/2011 |
| EP | 2522605 A1 | 11/2012 |
| WO | 2007/091164 A1 | 8/2007 |

State of the Art

State of the Art

State of the Art

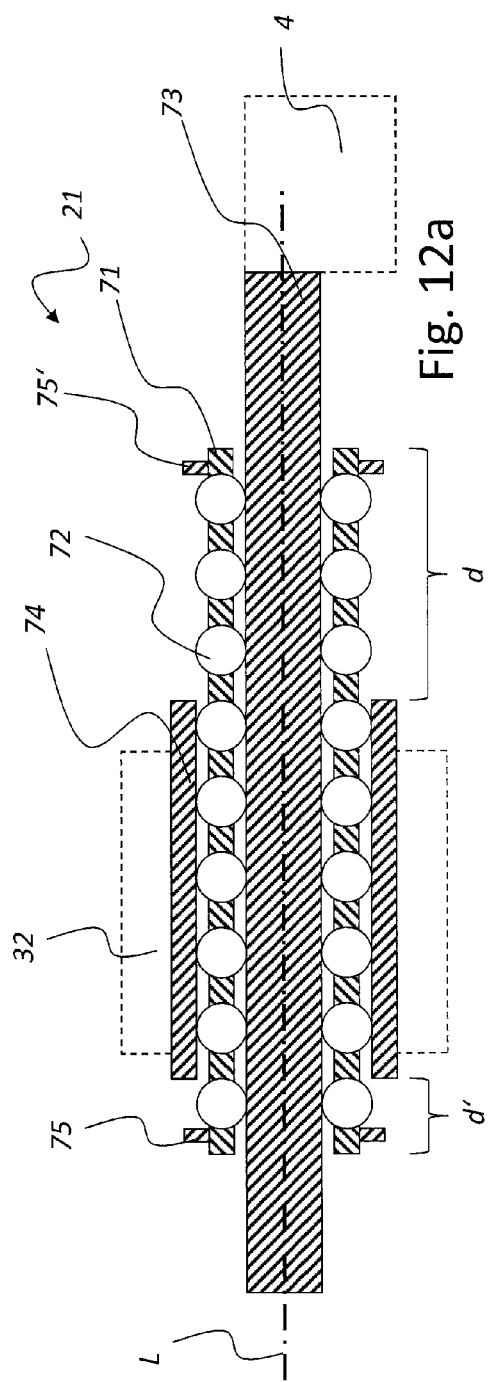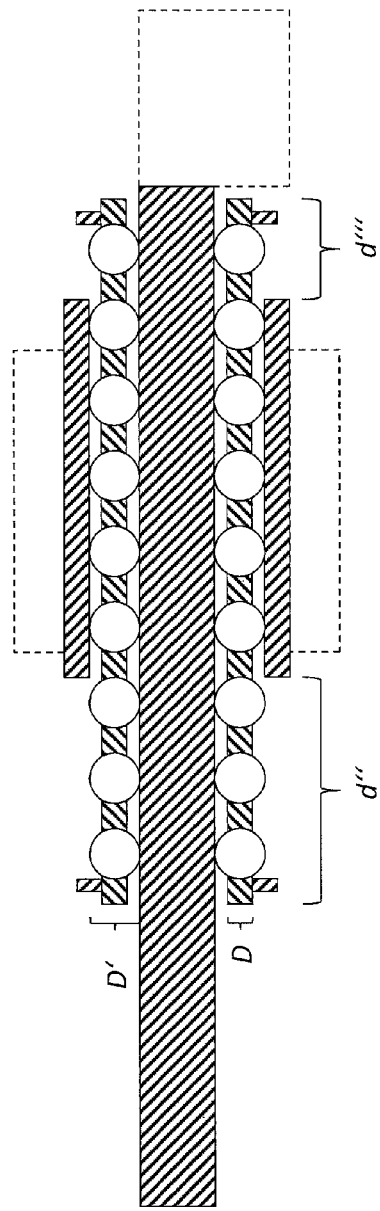

TRANSPORT DEVICE AND METHOD FOR TRANSPORTING PLASTIC CONTAINERS OR PREFORMS

This invention concerns a device for reshaping preforms into plastic containers, a transport device for use in a reshaping device, as well as a related method having the characteristics of the independent claims.

When filling plastic containers with beverages, in practice, a sterilisation procedure takes place over the course of a production process starting from a preform and ending with a filled bottle, in order to counteract later microbial contamination in the container and ensure the shelf life of the beverages. After the completion of a sterilisation process, it is not entirely possible to rule out the subsequent microbial contamination in some cases, because the sterilised container must be subjected to several additional treatment processes; as such, there is the risk of new soiling and/or microbial contamination during transport to the respective treatment and/or handling stations.

Document DE102012221804, not yet published at the time of this application, discloses a stretch-blowing device for plastic containers, in which a transport star with several claws, arranged on transfer arms, that are both rotatable and linearly movable, is disclosed, wherein the claws, the rotatable mount of the claws as well as all bearings of the transfer arms are inside a clean room except for the drive and parts of the drive shaft of the star. Rotatability and linear mobility are required in order to adjust the distance between the preforms on a transport device for the next treatment system. For example, the distance between two blowing stations is generally greater than the distance between the preforms during heating in the oven. However, the linear bearings of the transfer arms in the aforementioned document have a mount that is pushed to its limits by the very substantial forces and torques, thus limiting throughput (containers per hour). Further, the sliding rollers used and their attachment are not so well-suited for an application in a clean room, with respect to sterilisability.

A primary objective of this invention is thus to provide a device and method with which high outputs are possible whilst preferably improving a cleaning and/or sterilisation capability.

This objective of the invention is achieved by a device having the characteristics of independent claim 1, a transport device for use in a device for reshaping plastic preforms into plastic containers, and by a method having the characteristics of the independent claims. Additional advantageous embodiments are described by the respective dependent claims.

The device according to the invention for reshaping preforms into plastic containers comprises at least two blow moulds in which the preforms are expanded into plastic containers arranged on a circumferentially driven blowing wheel, a heater for heating the preforms, and a transport device for the plastic containers or preforms, which transport device comprises:

a motor drive having a drive shaft that drives a support, with at least two gripping and/or support elements for the respective plastic containers or preforms to be transported, in a rotary fashion, wherein the gripping and/or support elements are mounted with a linear bearing so as to be movable relative to the support, characterised in that the linear bearing has at least one rail, which is surrounded at least in sections by a cage, and that a plurality of rollers, in particular more than 50 rollers, which roll or move on the rail, is arranged in the cage.

By using a cage and a plurality of rollers running in the cage, the stresses or forces can be distributed over a large surface, such that even very high rotational speeds of the transport device, and an associated higher throughput, can be achieved without damaging the mount. Additionally, a cage with rollers running therein is easier to clean or sterilise.

The transport device transports the preforms and/or containers, preferably on a horizontal plane. In particular, the preforms are also transported on a horizontal plane by the blowing wheel.

In particular, the device has two such transport devices, one of which is designed to insert the preforms into the blowing wheel, and the other of which is designed to remove the containers from the blowing wheel. In this case, the transport devices are arranged substantially at a tangent to the blowing wheel, seen in the direction of the centre of the Earth. The conveyor line for the preforms in this area of the device is substantially meander-shaped. Alternatively, it is also possible to provide a single transport device (i.e., only one star) for inserting and/or removing the preforms or containers, whereby, e.g., every second claw inserts containers and all other claws in between remove containers.

It is also possible to provide three or more such transport devices, in particular if other treatments of the preforms or plastic containers are carried out. In the direction of transport, the following arrangement, for example, would be possible:

Tempering device, transport device, sterilisation device, transport device, blowing wheel, transport device.

The device may, in particular, comprise a substantially closed clean room. In this clean room, in particular said at least two blow moulds, the support, the linear bearing, and said at least two gripping and/or support elements are completely received.

The clean room may have an atmosphere containing fewer germs, impurities, bacteria, or spores than the atmosphere outside of the clean room. In particular, to this end, an air filter may be arranged on the device, through which (e.g., by means of a fan) filtered air is introduced into the clean room. In particular, the air introduced may be substantially sterile air. In particular, thus, the clean room is maintained under a slight overpressure compared to the atmosphere outside of the clean room. The pressure differential may range, e.g., between 0.1 mbar and 400 mbar. In particular, the clean room may have seals to seal at least some areas of the clean room off from the outer atmosphere. The seals may be seals consisting of elastic material or hydraulic seals such as water locks. The seals may be preferably circular in shape and formed around the perimeter of the rotating support. In particular, the seals are aseptic seals. Additionally, the clean room and/or parts of the reshaping stations located in the clean room may be cleaned and/or sterilised at specified, in particular regular, intervals. Preferably, cleaning may be carried out first with foam and then with sterile water to remove the foam. A sterilisation may be performed using gaseous hydrogen peroxide. The means for introducing the cleaning and sterilisation agents may be stationary nozzles, or nozzles arranged so as to rotate with the support. Sterilisation medium may also escape, e.g., through blow nozzles of the reshaping stations. The aforementioned means for providing the clean room or combinations thereof may be used in accordance with the requirements for the hygiene, cleanliness, or sterility of the machine or the plastic containers produced by it.

At least sections of the cage are arranged, in particular, within a guide, at least sections of which surround the cage (in particular in the circumferential direction of the cage), whereby the rollers roll on the guide or its inner surface.

The length of the cage in a longitudinal direction of the linear bearing is, in particular, longer than the guide and/or the rail. Thus, areas of the cage may be exposed at least at some times, and may be made accessible for sterilisation and/or cleaning. Cleaning may be carried out, e.g., with foam, whereby the foam is applied, in particular, via nozzles at least temporarily aimed at the linear bearing. Sterilisation may be carried out, e.g., by means of gaseous hydrogen peroxide ($H_2O_2$), which in particular exits from blow nozzles associated with the blow moulds and thus sterilises, in particular, both the blown air channels and the inside of the clean room, because it distributes itself throughout the device or its clean room in this state. If sluices are arranged between individual transport devices, other, in particular stationary, nozzles may be present to introduce $H_2O_2$ into the clean room.

A distance of an outer side of the cage from the guide and/or an inner side of the cage from the rail is, in particular, greater than one twentieth, preferably one twelfth, of the distance from the inner side of the guide to the outer side of the rail. The distance from the inner side of the guide to the outer side of the rail may substantially correspond to the diameter of the rollers. Thus, sterilisation gas may also penetrate between these two surfaces, sterilising both these and the rollers.

A distance of the outer side of the cage from the inner side of the cage is, in particular, at least one tenth, preferably at least one fifth, of the distance from the inner side of the guide to the outer side of the rail.

The linear bearing is designed, in particular, so as to be free of lubricant. The cage is made, in particular, of a plastic, in particular PEEK or another material that is resistant to the sterilisation agent. In particular, both the rail and the guide are made of stainless steel or coated steel that is resistant to the sterilisation agent. These materials are very well suited to absorb substantial forces, and simultaneously offer good corrosion behaviour, in particular when they come in regular contact with aggressive cleaning and/or sterilisation agents.

In the longitudinal direction of the linear bearing, a stop for the guide is arranged on at least one end, preferably both ends, of the cage. The stop ensures that the cage cannot move too far relative to the rail, and is 'retrieved' by the guide in the event of such movement.

The cage is formed, in particular, as a cylindrical sleeve, in which a plurality of holes, the longitudinal axes of which are arranged substantially perpendicular to a central axis of the linear bearing, is located both along the longitudinal direction and the circumferential direction, and wherein, in particular stainless steel or ceramic spheres are arranged as rollers in the holes. By distributing the rollers along the whole perimeter and the whole length of the cage, optimal force absorption is possible in all directions.

In particular, the rollers rotate relative to the cage.

Preferably, at least two linear bearings, in particular having cylindrical rails, are provided for each gripping and/or support element to mount the gripping and/or support element. Additionally, greater forces may thus be absorbed with a relatively thin diameter of the guides/cages/rails. Alternatively, however, it is also conceivable to use only one linear bearing per gripping and/or support element with a contoured rail (e.g., with a rectangular or double-T support cross-section).

In particular, a valve is provided that is arranged between a reservoir with sterilisation and/or cleaning medium and the clean room, and which may be opened to let in the sterilisation and/or cleaning medium, and wherein a controller is designed such that at least substantially simultaneously the transport device is driven in a rotating fashion via the drive and the valve is kept open.

The transport device according to the invention for use in a device for reshaping preforms to plastic containers comprises a motor drive with a drive shaft that drives a support, with at least two gripping and/or support elements for the respective plastic containers or preforms to be transported, in a rotating fashion, wherein the gripping and/or support elements are mounted with a linear bearing so as to be movable relative to the support. The linear bearing has at least one rail, at least sections of which are surrounded by a cage. Within the cage, a plurality of rollers, in particular more than 50 rollers, is arranged so that they roll on the rail.

In particular, the transport device is suited to transfer preforms into a blow mould arranged on a rotating blowing wheel and/or to remove finished containers from this mould.

It is conceivable, for example, for the sterilisation of the preforms to occur prior to a stretch-blowing process and for the preforms to be transported on by means of a transport device according to the invention to a downstream blowing wheel of a blow moulder or stretch-blower. Additionally, additional stations, e.g., an oven for heat treatment of the respective preforms, may be arranged upstream of the sterilisation station for the respective preforms. It is also conceivable for the containers moulded from the preforms to be transported via a transport device according to the invention in the direction of other stations, e.g., a filling and/or sealing station, after passing through the stretch blower.

The transport device may thus be provided for transporting containers or preforms. Accordingly, the respective gripping and/or support elements are formed to receive the respective containers or preforms. For example, the gripping and/or support elements may be formed by controllable opening and closing gripper fingers or gripping tongs or clamps. It is also conceivable for the gripping and/or support elements to additionally or alternatively comprise a stand mounting plate or a turntable on which the containers or preforms are arranged during transport via the transport device. At least two gripping and/or support elements are provided that are driven in a rotating fashion by means of the support and the motor drive. In practice, however, embodiments have proven to be effective, in which a plurality of gripping and/or support elements for a corresponding number of containers or preforms are arranged on the support, the necks of the containers or preforms are held by means of the gripping and/or support elements, normally below a so-called threaded area and/or alternately above and below a 'neck ring', an annular ledge below the threaded area.

The motor drive may be formed, e.g., as an electrical servo motor, optionally as a hydraulic drive, etc. The transport device may be formed, e.g., as a so-called 'reduction starwheel' with which the containers or preforms are brought to a specified distance during transport by means of the transport device. Thus, the preforms may, e.g., be supplied by an injection-moulding machine and moved to the transport device, whereby the distances between the preforms are relatively small. In order to heat the preforms and subsequently bring them into the specified container shape using a blowing or stretch-blowing process, they must be spaced apart from one another, which may be done, in particular, by means of such a reduction starwheel or several consecutive reduction starwheels.

In a preferred embodiment of this invention, the drive shaft has a flange section in the area of the end facing away from the drive, by which the support can be affixed to the drive shaft. The rotating movement of the drive shaft may occur about a substantially vertically oriented axis.

The support may be formed, e.g., as a hub. The gripping and/or support elements may be formed on a lower side of the hub facing the drive. For example, the gripping and/or support elements may be arranged on the hub at regular intervals. It may also be useful for the gripping and/or support elements to be arranged or fastened on the support or hub at respectively equal radial distances from the drive shaft.

Further, it may be useful for the support or hub to have one or more recesses in order to reduce its mass and thus its moment of inertia. On the other hand, in this way, cleaning fluid may be transferred to components of the transport device adjacent to the hub via the recesses during a cleaning or sterilisation process of the transport device. Generally, such recesses are advantageous in order to reduce the mass of the respective hub and to save material in the production of the hub. Additionally, the recesses may be used for uniform and/or fast heating of the components. The heating is used to avoid sterilisation gas condensing on the surfaces during the sterilisation process. In particular, the linear bearing is heated to a temperature above the dew point of a sterilisation gas, in particular $H_2O_2$. Likewise, all the other parts may be heated to this temperature within the clean room.

Additionally, the transport device has at least one substantially closed clean room, or is part of such a clean room, in which the support and said at least two gripping and/or support elements are completely received. Thus, the clean room may preferably have an entry and an exit, through which the preforms or containers can be guided into the clean room and out of the clean room, and no other open or unsealed passages. The clean room may also be formed by several wall sections delimiting the clean room, which may be made, e.g., of plastic or metal. It is also conceivable for multiple hubs and gripping and/or support elements of several transport devices to be arranged in a clean room, wherein the clean room is designed as a common clean room for the several transport devices. At least approximately sterile environmental conditions are present in a clean room. To this end, the clean room may be disinfected cyclically, e.g., every 48 hours. It is conceivable for cleaning gas and/or fluid to be inserted or vaporised into the clean room and subsequently discharged or suctioned out of it. For example, the cleaning gas may contain hydrogen peroxide and be supplied at a temperature of about 130-150° C. to the clean room. Preferably, during a cleaning process, at least the hub and the gripping and/or support elements are moved together with the hub. Here, too, it is advantageous for the hub to have recesses, because, at the aforementioned temperatures of the cleaning gas or fluid and the lower hub mass resulting from the recesses, the hub can be heated more quickly due to the intrinsic temperature of the cleaning gas.

It is also conceivable for the cleaning process for the transport device using cleaning gas to be preceded by a process for cleaning the transport device with cleaning fluid. A cleaning process may be followed by a rinsing step with sterile water to remove cleaning fluid residues.

In a preferred embodiment of the present invention, the drive may be formed as a standing leg at least partially bearing or supporting the transport device. To this end, the motor drive may stand on a bottom surface of the machine or a base, and/or be arranged on other support structures, wherein one or more components of the transport device are supported or borne by the motor drive. Advantageously, the motor drive is arranged in the area of a centre of gravity of the transport device, such that the formation of the motor drive as a standing leg and its placement in the area of the centre of gravity result in a stable mount of the transport device. The drive may be formed as a direct drive, meaning that no transmission is present. In particular, the drive shaft is then the rotor, and at least some areas of it are surrounded by a stationary stator.

Furthermore, a support structure extending away from the drive may be arranged on an upper side of the drive that faces the clean room, one or more components of the transport device arranged in the clean room, or the clean room together with one or more components of the transport device arranged in the clean room being fastened thereon. In this case, the support structure may be arranged outside of the clean room. It is conceivable for the motor drive to have a flange section, on which the support structure is affixed, on its upper side that faces the clean room.

In particular, embodiments have proven to be effective in which the support structure has several cantilever arms having at least one support column each, extending away from the drive, on which one or more components of the transport device arranged in the clean room are fastened, or the clean room is fastened together with one or more components of the transport device arranged in the clean room. The cantilever arms may be formed so as to protrude from the motor drive or flange section of the motor drive in a star-shaped fashion. For example, four or more cantilever arms having at least one support column each may be provided. One or more of the support columns may be formed in two parts with a first and a second section each. The first section of each support column and the second section of each support column may be arranged so as to be aligned with one another. It is also possible for a lower wall section of the clean room to be in the area of contact points of the first section of each support column and the second section of each support column. The support columns may each penetrate through the clean room in the area of the contact points. In the area of the respective contact points, a seal system may also be provided.

In order to further prevent or reduce contamination of the clean room, in a preferred embodiment of this invention, the motor drive may be arranged outside of the clean room, and the clean room may have an opening through which the drive shaft of the motor drive enters the clean room. For example, the opening may run through a lower wall section of the clean room. It may also be advantageous for the clean room to be sealed off from an outside area and in the area of this opening by means of a sealing system, in particular by means of a fluid-based sealing system. The sealing system may be formed, e.g., as a water lock. It is conceivable for the sealing liquid to be exchanged together with the contaminants bound by it in regular intervals. In particular, a plastic seal, in particular a seal made of rubber-like material, may also be used.

Further, the gripping and/or support elements may be pivotally arranged on the support, and the transport device may comprise a guide unit, in particular a cam disc, completely arranged within the clean room. The gripping and/or support elements are operatively connected with said guide unit such that a rotation of the support results in definition of the gripping and/or support elements, and these can be pivoted and/or raised relative to the support. For example, the gripping and/or support elements may be fastened to the support by means of one bolt each, wherein the bolt passes through or engages with a recess of the respective gripping and/or support element. The bolt may be formed as a pivot axis for the respective gripping and/or support element. For example, the respective bolts may extend parallel to the drive shaft. The guide unit may also be formed as a guide washer, at least sections of which, if applicable, are arranged parallel to the support, which is formed as a hub. It is also conceivable for the guide unit to extend completely around the drive shaft.

The guide unit may also comprise at least one guide surface, preferably, however, at least two guide surfaces, into which at least one or more engagement means, in particular guide rollers and/or guide bearings of the respective gripping and/or support means are forcibly guided in the event of rotation of the support. The engagement means may also be formed as rods, bolts, or fingers that slide in the respective guide surface in simple embodiments.

The guide surface is thus adapted to the shape of the respective engagement means. Guide rollers and/or guide bearings may be formed so as to be accessible in this case, such that, during cleaning, all components of the respective guide roller and/or guide bearing can receive cleaning fluid. Practically, in particular, open radial bearings or plain bearings with no lubricants or antifriction agents have proven to be suitable for this purpose. For example, the engagement means may be formed by appropriate plastic elements. Preferably the guide surface may run entirely around the drive shaft, whereby the radial distance of the guide surface from the drive shaft increases and decreases over its course around the drive shaft.

In a preferred embodiment of the present invention, the guide unit may have a first and second guide surface. Further, each of the gripping and/or support elements may have at least one first and at least one second engagement means. Each of said at least one first engagement means may be forcibly guided in the first guide surface; each of said at least one second engagement means may be forcibly guided in the second guide surface. The first and second guide surfaces may run entirely around the drive shaft. The first guide surface may be at a substantially radially uniform or radially increasing and decreasing distance from the drive shaft over its course around the drive shaft; the second guide surface may have a greater radial extent from the drive shaft than the first guide surface, and also be at a substantially radially uniform or radially increasing and decreasing distance from the drive shaft over its course around the drive shaft. Said at least one second engagement means may be coupled to the linear bearing via the respective gripping and/or support element, such that guiding the respective second engagement means in the second guide surface results in a raising or retracting movement of the respective gripping and/or support element. Additionally, guiding the respective first engagement means in the first guide surface may result in a pivoting movement of the respective gripping and/or support element. The transport device may thus be formed as a reduction starwheel. Preferably, the first guide surface and the second guide surface, as well as said at least one first engagement means and said at least one second engagement means may be formed of plastic and/or ceramic and/or stainless steel, or a suitable light metal. In particular, engagement means formed as rollers are mounted with full ceramic bearings, in which ball races are provided that are also made of plastic or metal. These bearings are also formed without lubricants. This mount is used, in particular, for all engagement means of the transfer arms. Likewise, this mount may be used for the pivot bearing on the base.

Other embodiments are also conceivable in which a predefined pivot movement of the gripping and/or support elements is coupled to a predefined raising movement of the gripping and/or support elements. Preferably, embodiments with forcible guidance have proven to be suitable. For example, it is possible for the pivoting and raising movements to be coupled with each other such that the respective preforms or plastic containers can be moved in a linear direction in at least some sections during transport.

It is conceivable for the guide unit to have one or more recesses. Thus, in a cleaning or sterilisation process of the transport device, cleaning fluid and/or cleaning gas may be transferred to components of the transport device adjacent to the guide unit via the recesses. It is conceivable, e.g., for hydrogen peroxide to be transferred to components of the transport device adjacent to the guide unit during cleaning.

Additionally, a support system bearing the guide unit, having one or more connectors for replaceable fixation of the guide unit, may be arranged in the clean room. For example, the connectors may engage the support system in a form- and/or force-fitting manner. Further alternative or additional means, e.g, snap-on and/or click-on and/or clamping connections are also conceivable to affix the guide unit to the support system. The support system may also extend entirely around the drive shaft. Additionally, it is possible for the guide unit to be arranged between the support system and the support.

Instead of the guide unit, electrical or magnetic drives may also be applied, either for the linear movement of the gripping and/or support elements or the pivot movement of the gripping and/or support elements, or both.

It is also conceivable for several components of the transport device to be screwed together. In particular, screw connections without indentations have proven to be suitable, because experience shows that the risk of germ formation or contamination is reduced in such screw connections. Care should also be taken with the other components and connections in the clean room to ensure the smoothest surfaces and the smallest number of sharp edges and indentations possible in order to reduce germ adhesion and to improve the cleaning of all components, in particular moving parts.

Furthermore, the invention concerns a method for operating a device for reshaping preforms into plastic containers, wherein the preforms are transported along a conveyor line, wherein the preforms are tempered in a heater and expanded into plastic containers in at least two blow moulds arranged on a circulating blowing wheel, and wherein the preforms and/or plastic containers are transported by a transport device driven by a motor drive with a drive shaft, and on which the preforms or plastic containers are held by at least two gripping and/or support elements arranged on a support, wherein the gripping and/or support elements are mounted with a linear bearing so as to be movable relative to the support. The linear bearing has at least one rail, at least sections of which are surrounded by a cage. Within the cage, a plurality of rollers, in particular more than 50 rollers, which roll on the rail, are arranged.

During circulation, in particular, areas of the cages are exposed and are cleaned or sterilised by sterilisation and/or cleaning agents. 'Exposed' means, in particular, that these areas are not covered by other parts, in particular of the guide. In particular, 'exposed' may also mean that the areas are accessible to the hands of an operator. An exposed area can thus be sterilised in particular without any disassembly of the component.

In particular, a sterilisation mode is carried out from time to time in which sterilisation agents, in particular gaseous $H_2O_2$, is introduced into a clean room of the device in which at least the gripping and/or support elements and the linear bearing of the transport device are arranged. During the sterilisation mode, in particular, no containers are produced. In particular, the transport device is operated so as to circulate continuously at least occasionally during the sterilisation mode.

In particular, in the method for transporting plastic containers or preforms, the support is driven in a rotary fashion by a drive shaft of a motor drive, and is arranged entirely in a substantially closed clean room together with the gripping and/or support elements. Additionally, the respective plastic containers or preforms to be transported may be guided completely in the substantially closed clean room during transport by the respective gripping and/or support elements of the support.

Preferably, the respective plastic containers or preforms to be transported are introduced into the clean room or enter the clean room by means of the respective gripping and/or support element.

Additionally, it may be useful for the plastic containers or preforms to be sterilised before being inserted or conveyed into the substantially closed clean room and transferred to a treatment station and/or another transport device after conveyance. Preferably, the plastic containers or preforms may be introduced into the clean room immediately before, during, or immediately after sterilisation.

It is also possible for the relative distance between the plastic containers or preforms to be modified in a defined fashion during transport. To this end, the transport device may be formed, e.g., as a reduction starwheel.

To ensure the sterility of the clean room at least to a substantial extent, a cleaning and/or sterilisation process of the clean room and/or transport device may be carried out at predetermined intervals. During such a cleaning process, preferably no plastic containers or preforms are arranged in the clean room. However, during the cleaning process, the hub, and the gripping and/or support elements together with the hub, may be moved via the motor drive in order to wet all components with cleaning and/or sterilisation fluid and or cleaning gas as far as possible.

Thus, for example, after transport of the plastic containers or preforms, a cleaning and/or sterilisation process of the transport device may be carried out, in which transport device components arranged in the clean room are treated with cleaning and/or sterilisation fluid, and, in particular with sterilisation gas containing hydrogen peroxide.

Exemplary embodiments of the invention and their advantages are described below by reference to the attached drawings. The size ratios of the individual elements to one another in the drawings do not always correspond to the actual ratios, as some forms are simplified and others have been magnified as compared with other elements for better illustration.

FIG. 11 illustrates an embodiment of the method according to the invention.

FIGS. 12a and 12b show a longitudinal section of a linear guide along line Z-Z of FIG. 6.

Figure 1:
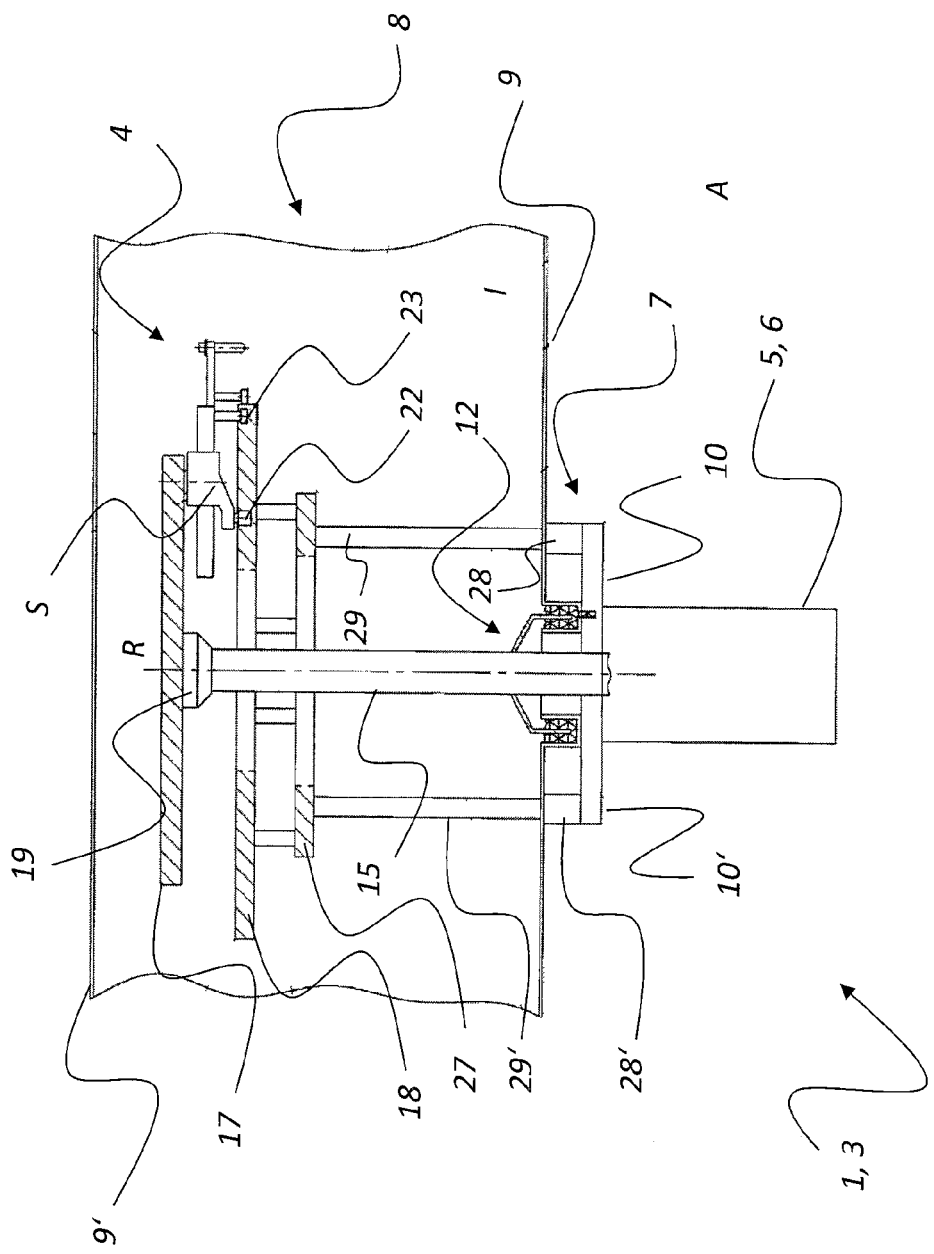
FIG. 1 shows a schematic cross-section of an embodiment of a transport device according to the invention.

Identical reference numerals are used to designate the same or functionally similar elements of the invention. Additionally, for ease of reference, only reference numerals required for the description of the respective drawing are included in each drawing. The embodiments shown are merely examples of possible configurations of the device or method according to the invention and are in no way intended to be limitations thereof.

FIG. 1 shows a schematic cross-section of an embodiment of a transport device 1 for plastic containers 2 (cf. FIG. 7) or preforms according to the invention. The transport device 1 is formed here as a reduction starwheel 3, by which the plastic containers 2 or preforms can be placed at predetermined distances from one another during transport by the device 1.

The transport device 1 comprises a motor drive 5, which also serves as a standing leg 6 for the transport device 1 or the reduction starwheel 3. The motor drive 5 comprises a drive shaft 15, which can be driven in a rotary fashion by the motor drive 5. The reference R in FIG. 1 refers to the rotational axis of the drive shaft 15. The free end of the drive shaft 15, facing away from the motor drive 5, has a flange section 19, on which the support element 17 is attached. The support element 17 is thus driven in a rotary fashion via the drive shaft 15 around the rotational axis R.

On an underside of the support element 17, several gripping and support elements 4 are arranged, of which only one element 4 is shown in FIG. 1. The gripping and support elements 4 are each arranged on a side of the support 17 facing away from the motor drive 5 so as to pivot around a vertical pivot axis S. Additionally, the gripping and support elements 4 are each mounted via one or more first guide rollers 22 in a first guide surface 24, and in a second guide surface 25 via one or more second guide rollers 23 (cf. FIG. 5). The guide surfaces 24 and 25 are part of a guide unit 18.

The support 17 is rotatable via the drive shaft 15 relative to the guide unit 18, such that rotation of the support 17 relative to the guide unit 18 guides the first and second guide rollers 22 and 23 in their respective first or second guide surfaces 24 or 25. By means of the rotation of the support 17 relative to the guide unit 18, a defined pivoting or raising movement of the gripping and support elements 4 may be specified. Preferably, the guide surfaces 24 and 25, as well as the guide rollers 22 and 23, are free of lubricants and made of plastic. To mount the guide rollers 22 and 23, in particular ceramic ball bearings and/or suitable hybrid bearings are used. This can prevent contamination of the clean room 8, discussed in detail below, by lubricants. Additionally, the guide rollers 22 and 23, as well as the guide surfaces 24 and 25, may be formed such that their surfaces can be treated substantially completely with sterilisation fluid and/or sterilisation gas and/or cleaning agents during a cleaning process of the clean room 8.

Also shown is a support system 27. The guide unit 18 is affixed replaceably to the support system 27. Thus, optionally, several different guide units 18 may be attached to the support system 27 one after another, whereby, depending on the respective guide unit 18 affixed to the support system 27 and the course of its guide surfaces 24 and 25, a raising or pivoting movement of the gripping and support elements 4 may be specified in a predefined fashion in the event of a rotation of the support 17. The support 17, the guide unit 18, and the support system 27 are arranged entirely within the clean room 8. Sections of the drive shaft 15 are arranged in the clean room 8; the motor drive 5 is arranged outside of the clean room 8. Preforms or plastic containers transported via the transport device 1 or the reducing starwheel 3 move entirely within the clean room during transport. The clean room 8 comprises an upper wall section 9' and a lower wall section 9, wherein the drive shaft 15 penetrates through the lower wall section 9. In the area of penetration, an inner area I of the clean room 8 is sealed off from an outer area A by means of a fluid seal system 12. The fluid seal system 12 is formed as a water lock.

On the side of the motor drive 5 facing the clean room 8, a support structure 7 is arranged. The support structure 7 extends away from the motor drive 5, to this end, has several cantilever arms, of which two cantilever arms 10 and 10' can be seen in the cross-section of FIG. 1. Each of the cantilever arms 10 and 10' has a support column, each of which is formed here of a first section 28 or 28' and a second section 29 or 29'. The second sections 29 and 29' are connected with the support system 27. In the area of a contact point of the respective first section 28 or 28' with the respective second section 29 and 29', the support columns penetrate the lower wall section 9 of the clean room 8. Preferably, there is another seal system in the area of penetration in order to prevent contamination of the clean room 8.

Figure 2:
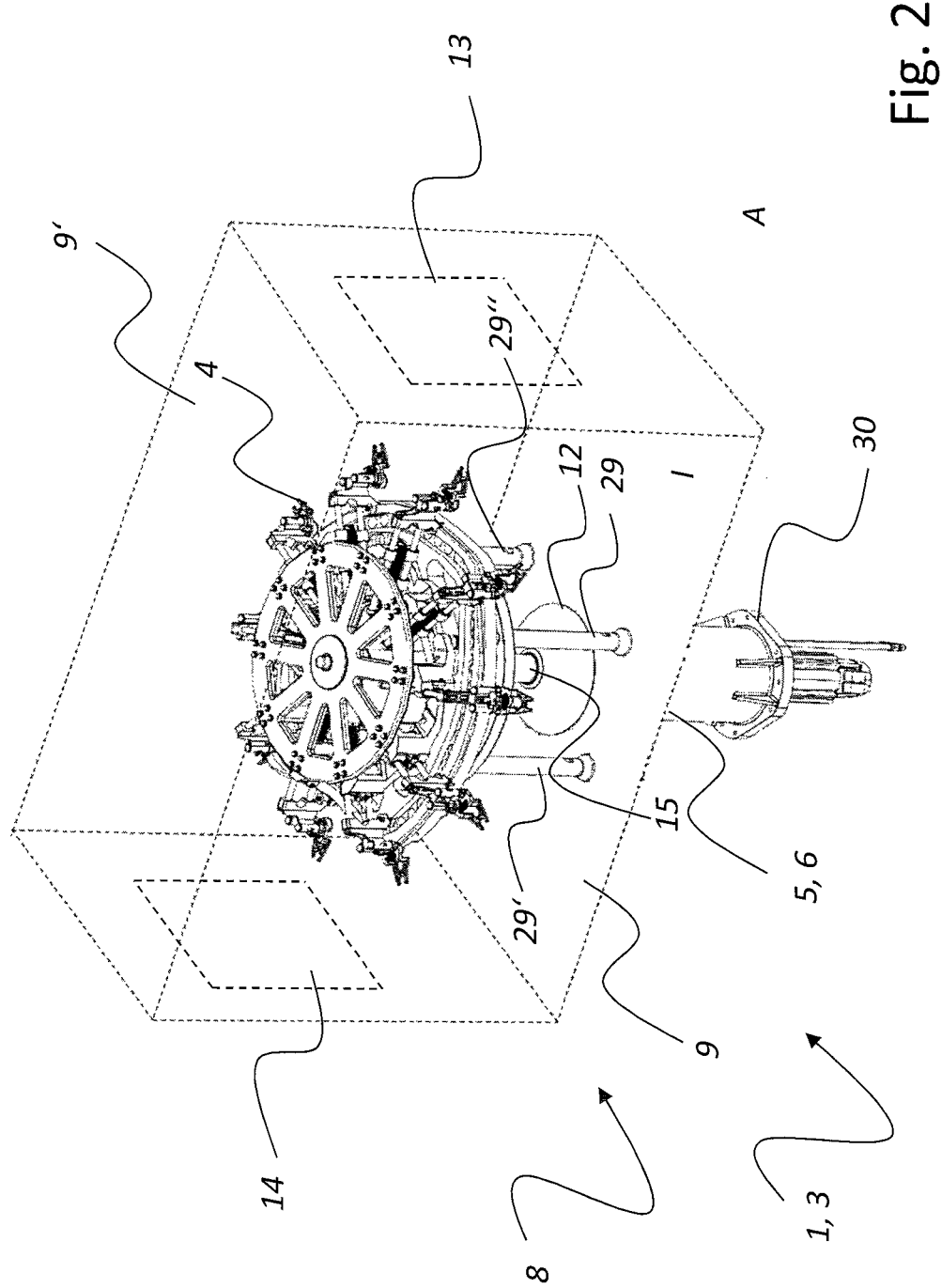
FIG. 2 shows a schematic perspective view of an embodiment of the transport device according to the invention that is located in a clean room.

The schematic perspective view of FIG. 2 again shows the transport device 1 according to the invention, or the reduction starwheel 3. In the embodiment shown, the motor drive 5, which is formed as a standing leg 6, comprises a flange section 30 on its lower side, facing away from the clean room 8, which may be provided, e.g., to attach the transport device 1 to a support system. FIG. 2 also clearly shows that the motor drive 5, which is formed as a standing leg 6, is arranged in the area of a centre of gravity of the transport device 1. On the lower side of the support 17, facing the motor drive 5, the gripping and support elements 4 are also arranged. The gripping and support elements 4 are arranged entirely within the clean room 8. The motor drive 5 is arranged outside of the clean room 8. It can also be seen that the upper sections 29, 29', and 29" of the support column shown in FIG. 1 are entirely arranged in the clean room 8, and have a seal system on their respective lower end facing in the direction of the motor drive 5. The lower housing wall 9 of the clean room 8 is shown to be non-transparent here, whilst the other housing walls of the clean room 8 are shown to be transparent.

The fluid seal system 12, which extends completely around the drive shaft 15 and seals the inside I of the clean room 8 from the outside A, is also visible. The reference numeral 13 refers to an entrance of the device, through which plastic containers or preforms can enter the area of the transport device and, after entering, are transported by the transport device 1 or the reducing starwheel 3 in the direction of the exit 14 to the blowing wheel. Both the entrance 13 and the exit 14 may be arranged in other positions of the clean room 8. The preforms are transferred inside a clean room 8 in this case. In particular, the preforms are directly transferred into a sterile room or clean room 8 of a blowing wheel (not shown) during transport through the exit 14. This prevents contamination of the preforms during transfer. It is also possible for other systems, e.g., a stretch blower and/or another transport device 1 or reducer starwheels 3 and/or sterilisers, fillers, sealers to be arranged in the clean room 8. The embodiment shown in FIG. 2 is provided by way of example only with regard to the size and shape of the clean room 8, such that persons skilled in the art may choose the size and shape of the clean room 8 in practice based on the applicable requirements. In the area of the transport device 1 and/or in the area of a blowing wheel and/or in the area of a sterilisation system downstream of the transport device 1, there may preferably be positive pressure.

The additional perspective view of FIG. 3 again shows the transport device 1 of FIG. 2, but without the clean room 8. For ease of understanding, the clean room 8 was not shown in FIG. 3. Shown are the support 17 and the guide unit 18. The support 17 has several recesses 17, through which cleaning fluid and/or cleaning gas may be transferred during a cleaning process of the transport device 1 to the guide unit 18 adjacent to the support 17. Also shown is a support structure 7 having several cantilever arms extending away from the motor drive 5, three of which are designated 10, 10', and 10". On each of the cantilever arms 10, 10', and 10", a lower section 28, 28', and 28" of a support column is arranged. The lower sections 28, 28', and 28" are arranged outside of the clean room 8 in the previous exemplary embodiment shown in FIG. 2.

Figure 3:
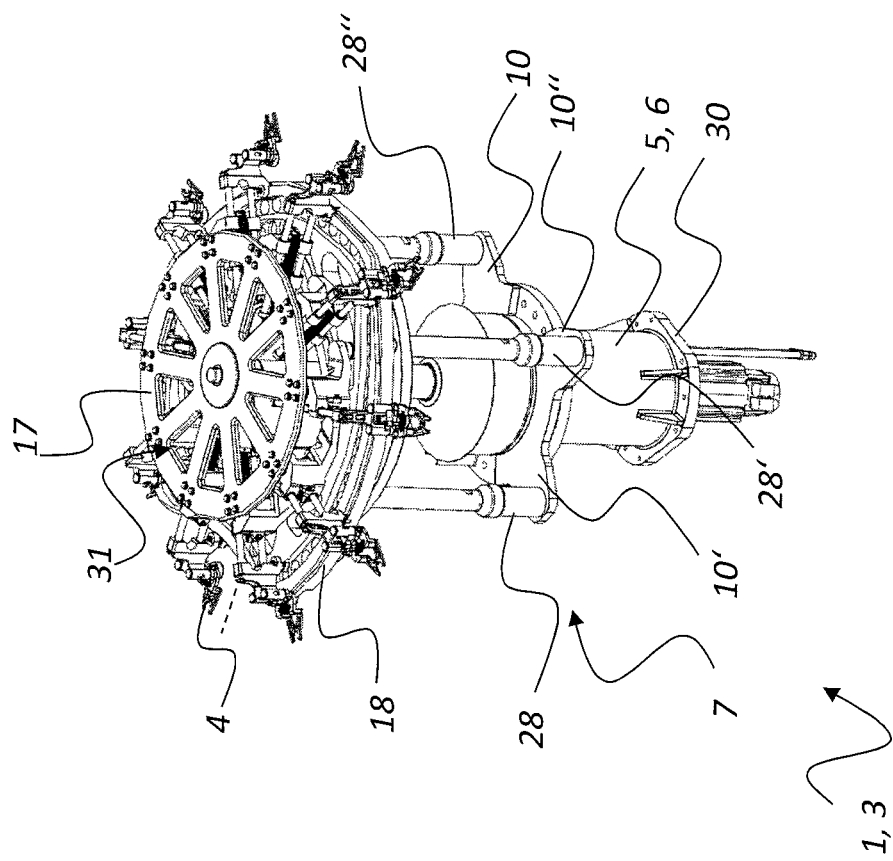
FIG. 3 shows another schematic perspective view of the transport device of FIG. 2 without the clean room.
Figure 4:
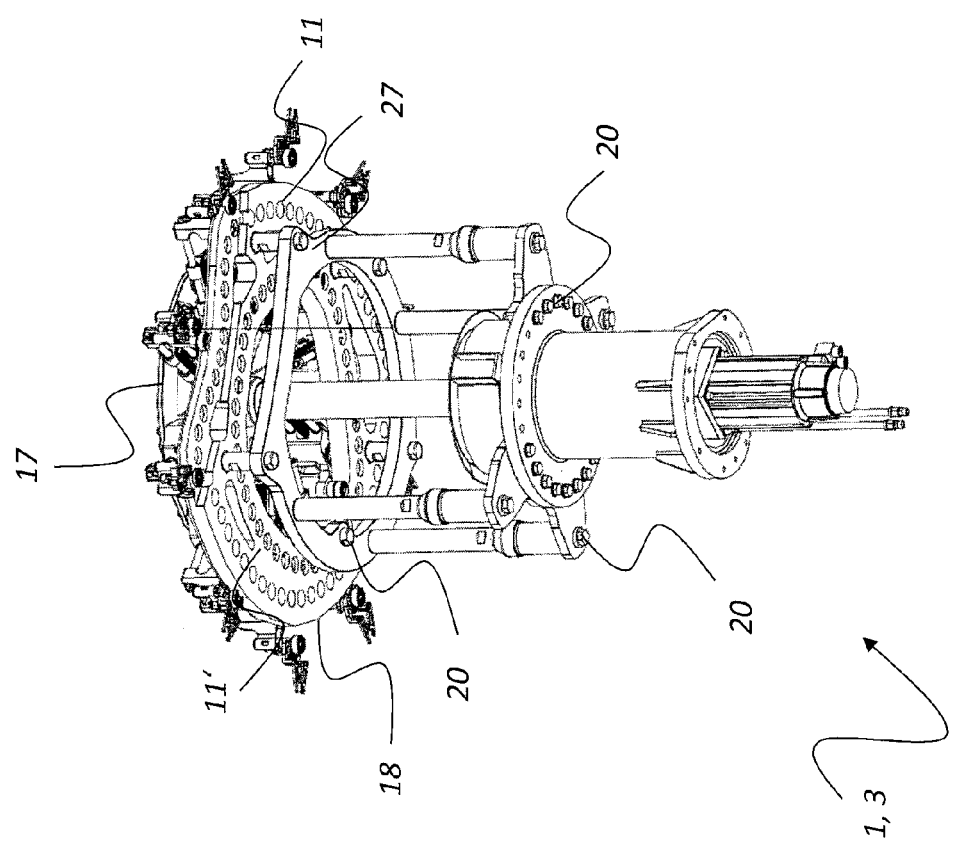
FIG. 4 shows a schematic oblique bottom view of the embodiment of the transport device shown in FIGS. 2 and 3.

FIG. 4 shows a schematic oblique bottom view of the embodiment of the transport device 1 shown in FIGS. 2 and 3. To connect or affix several components of the transport device 1, the transport device 1 has several screw connections 20. All screw connections 10 of the transport device 1 are formed here without indentations with outer polygonal heads. During cleaning, no cleaning fluid or cleaning gas residues can remain in the screw connections 20. Additionally, the accessible surface of the screw connections 20 may be treated completely with cleaning and/or sterilisation fluid or gas during cleaning or sterilisation.

Additionally, the guide unit 18 has several recesses 11 or 11'. The first recesses 11 are arranged in the area of a first guide surface 24 (cf. FIG. 5) of the guide unit 18; the second recesses 11' are arranged in the area of a second guide surface 25 (also FIG. 5) of the guide unit 18. Cleaning and/or sterilisation fluid or gas may be transferred during cleaning or sterilisation of the transport device 1 to components of the transport device 1 adjacent to the guide unit 18, e.g. the support system 27 or the support 17 via the recesses 11 and 11'. Additionally, the recesses 11 and 11' serve to reduce the mass of the guide unit 18, and, in particular, to allow for rapid heating of the guide unit.

The guide unit 18 is made, in particular, of aluminium, and arranged in a stationary or fixed manner.

Figure 5:
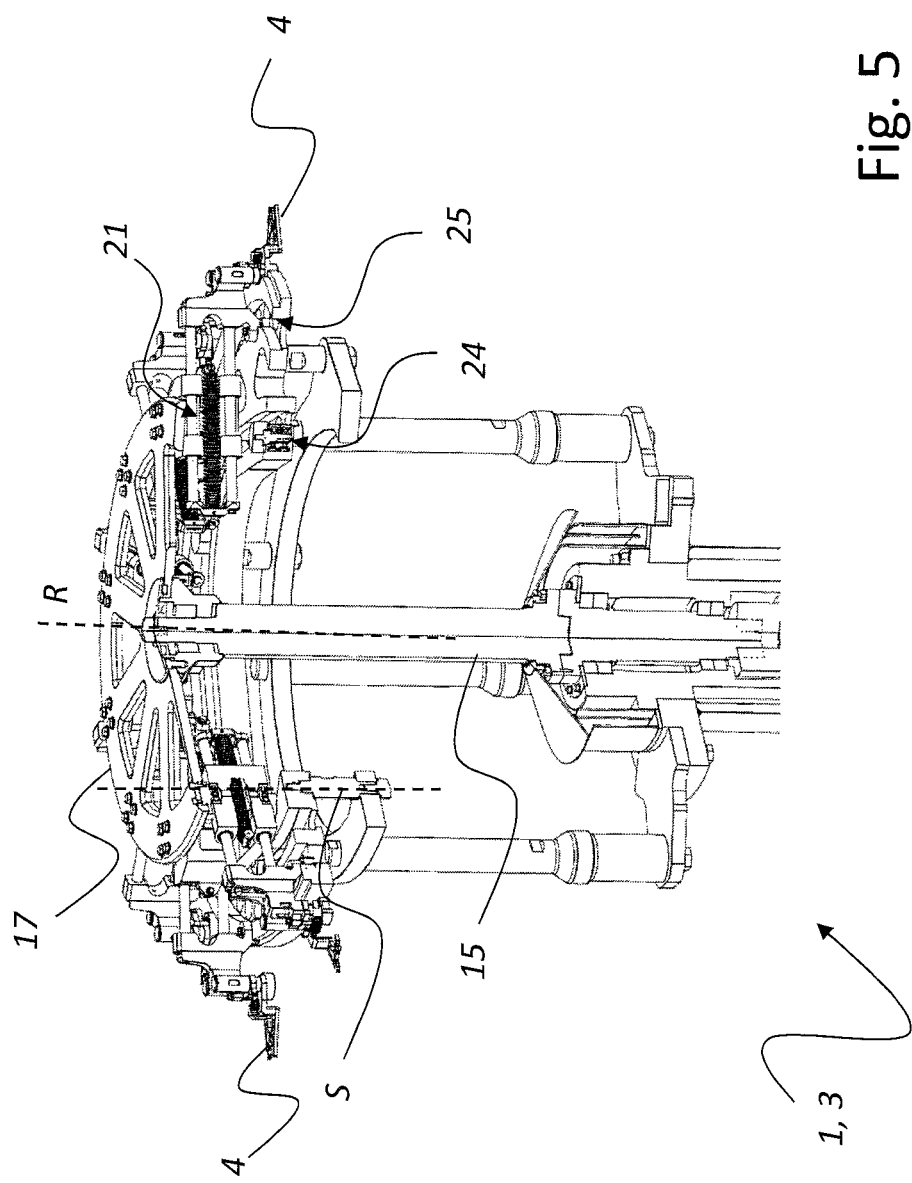
FIG. 5 shows a perspective partial longitudinal section of the embodiment of the transport device shown in FIGS. 2 to 4.

FIG. 5 shows a schematic sectional view of the embodiment of the transport device 1 or a reducing starwheel 3 shown in FIGS. 2-4. The first guide surface 24 of the guide unit 18 and the second guide surface 25 of the guide unit 18 can be seen. Each of the gripping and support elements 4 has one or more first guide rollers 22 and one or more second guide rollers 23. The first guide rollers 22 are forcibly guided in the first guide surface 24; the second guide rollers 23 are forcibly guided in the second guide surface 25. All guide and support elements 4 have a linear guide 21 (detail in FIG. 6) connected with the second guide rollers 23, such that the forcible guiding of the second guide rollers 23 in the second guide surface 25 and the rotation of the support 17 around the axis R can be used to specify a raising and return movement of the respective gripping and support elements 4. Additionally, the gripping and support elements 4 each have a base element 32 (cf. FIG. 6). The base element 32 is directly connected with the first guide rollers 22, such that the forcible guiding of the first guide rollers 22 in the first guide surface 24 and the rotation of the support 17 around the axis R allows for the specification of a pivoting movement of the respective guide and support elements 4 around the respective pivot axis S. Both the pivoting movement of the gripping and support elements 4 and the raising and return movement of the gripping and support elements 4 thus depend on the course of the guide surfaces 24 and 25. For example, the pivoting and raising movement of the gripping and support elements 4 may be such that the respective plastic container 2 or preform to be transported is guided in a linear movement in at least some sections during transport. In particular, in a reducing starwheel formed as an insertion starwheel, the combined pivoting and linear movement is used to accompany the preforms after insertion into the area of the blowing mould rotating with the blow wheel until the blowing mould is closed and can thus transport the preforms itself. The same applies to the removal of the container from a transport unit 4 formed as a removal starwheel.

Figure 6:
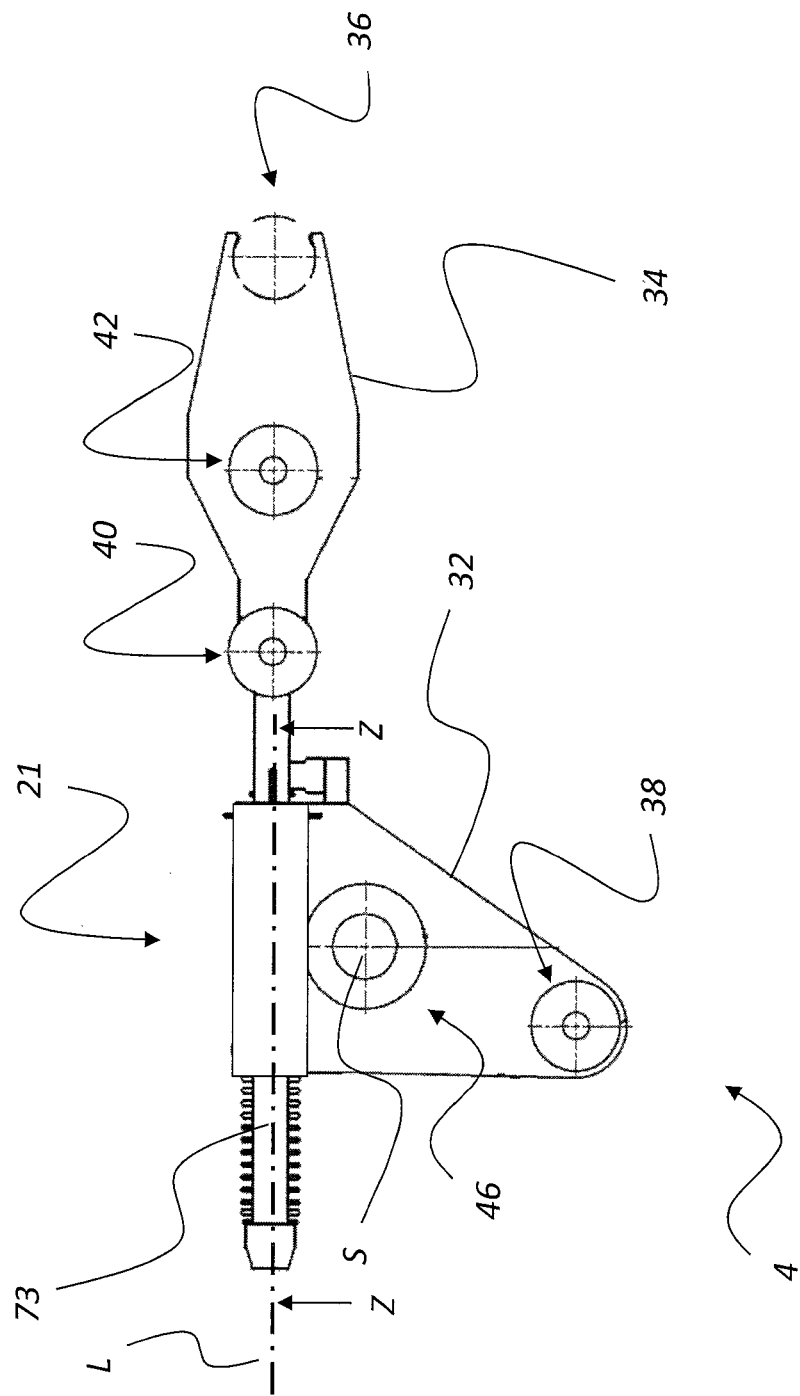
FIG. 6 shows a schematic top view of a gripping and support element that is part of the transport device according to the invention.

FIG. 6 shows a schematic top view of a gripping and support element 4 that can be used in an embodiment of a transport device 1 according to the invention. The gripping and support element 4 comprises a head 34 and a base 32 and a linear guide 21. The linear guide 21 comprises a rail 73. The head 34 has a receiving position 36 for a plastic container 2 or preform, and is connected with the rail 73. Another rail 73' of the linear guide 21 runs parallel to the rail 73 (cf. FIG. 7). The gripping and support element 4 is connected in a pivoting fashion with the support 17 via the base 32 (cf. Figures above). To this end, e.g., a bolt may engage with the mounting area 46 of the base element 32. A pivot bearing not shown in detail is preferably ceramic in this case as well, at least those parts having the running surfaces for the roller bodies. The roller bodies of the pivot bearing may also be made of ceramics or stainless steel. The pivot axis of the gripping and support element is further indicated by the reference S. A second attachment area 40 is provided for the fixation of the one or more second engagement means or said at least one second guide roller 23 (cf. FIG. 7). The second guide rollers 23 are connected with the rail 73, 73' such that, in the event of forcible guiding of the one or more engagement means or the one or more second guide rollers 23 in the second guide surface 25, movement of the one or more second engagement means or one or more second guide rollers 23 and the rail 73, 73' relative to the base element 32 results.

Figure 7:
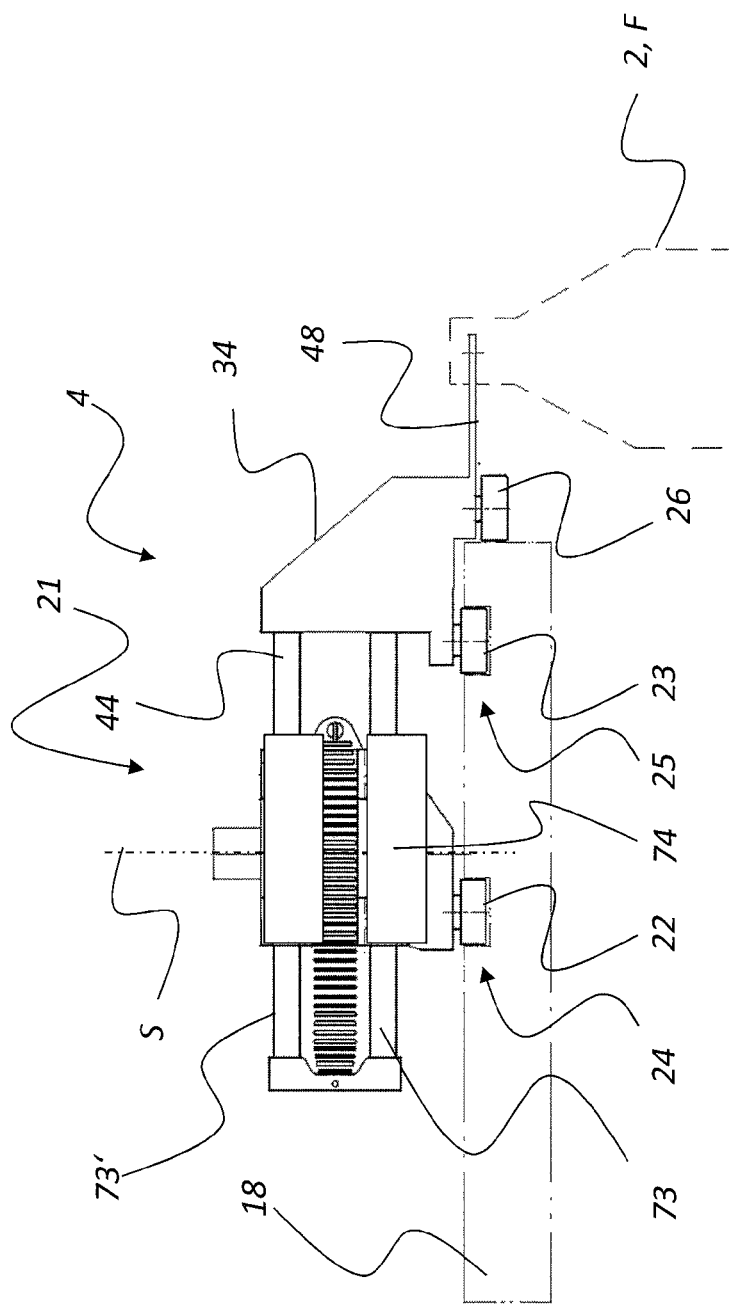
FIG. 7 shows a schematic side view of the gripping and support element shown in FIG. 6.

A first attachment area 38 is provided for the fixation of the one or more first engagement means or said at least one first guide roller 22 (cf. FIG. 7). The forcible guiding of the one or more first engagement means or the one or more first guide rollers 22 in the first guide surface 24 can thus cause a pivoting movement of the base element 32 and the entire gripping and support element 4 around the pivot axis S. The guide roller 22 is attached eccentrically to the pivot axis S.

Additionally, a third attachment area 42 is indicated. The third attachment area is located in the area of the head 34 of the gripping and support element 4, and provided to affix one or more cam rolls 26 (cf. FIG. 7).

FIG. 7 shows a schematic side view of the gripping and support element 4 shown in FIG. 6. The head 34 of the gripping and support element 4 has a clamp-shaped section 48, via which the respective plastic container 2 or preform to be transported can be received. The plastic container 2 is formed here as a bottle F. Shown is said at least one cam roll 26, which can be guided along the outer circumference of the guide unit 18 and with which the clamps 48 are opened by a mechanism not shown, in the event of movement of said at least one first guide roller 22 in the first guide surface 24 and said at least one second guide roller 23 in the second guide surface 25. The relative distance of said at least one cam roll 26 from said at least one second guide roller remains substantially unchanged in the event of movement of said at least one second guide roller in the second guide surface; only to open the clamps 48 when receiving (and optionally when removing) the preforms is the roller 26 moved slightly relative to the roller 23 (radially outward as seen from the axis R).

The linear guide 21 contains a first rail 73 and a second rail 73', which are guided together in parallel in the event of a raising or return movement of the gripping and support element 4. Both rails 73 and 73' are connected with the head 34. The reference 74 indicates a guide 74 for a rail 73, said guide being affixed to the base element 32. A guide 74 is also provided for the upper rail 73'.

Figure 8:
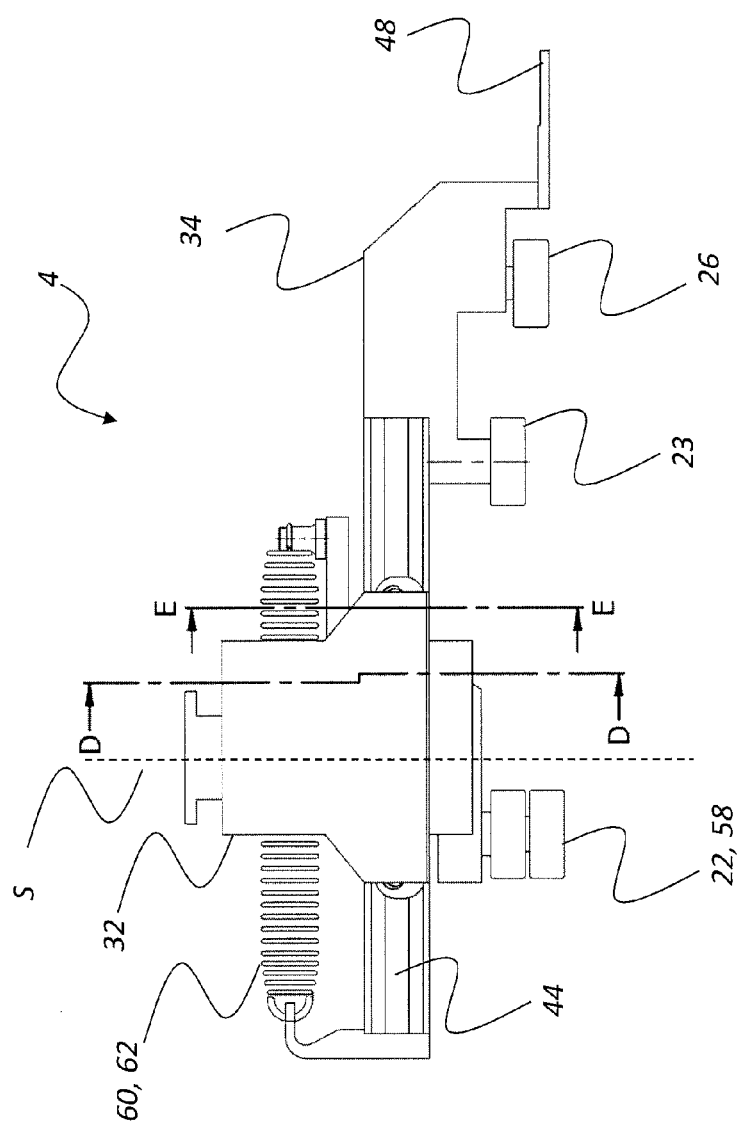
FIG. 8 shows a schematic side view of another embodiment of a gripping and support element that may be part of the transport device.
Figure 10:
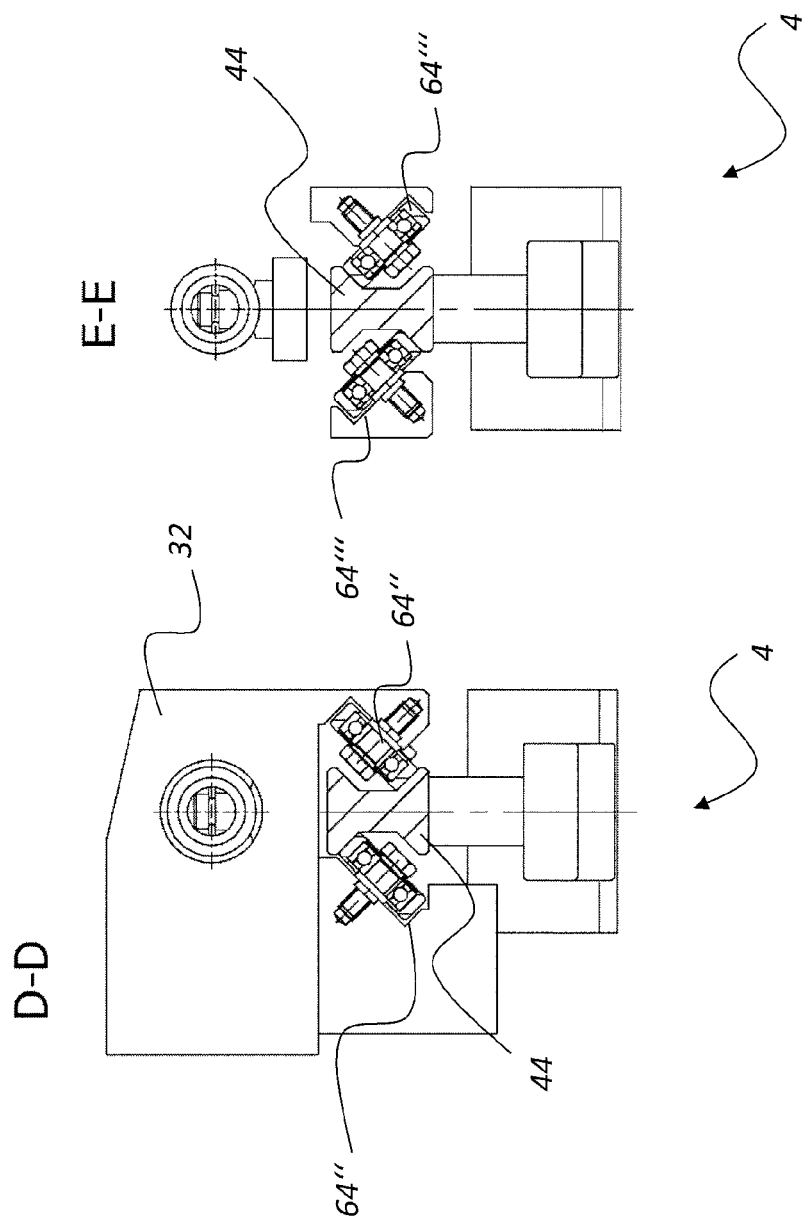
FIG. 10 shows two schematic cross-sections of the embodiment of a gripping and support element shown in FIG. 8 along intersection lines D and E.

FIG. 8 shows a schematic side view of an embodiment of a gripping and support element 4 according to the prior art. Like the exemplary embodiment shown in FIG. 7, the gripping and support element 4 has a head 34 with a clamp-shaped section 48 to receive a plastic container 2. Additionally, a supporting roller 26 is shown that is guidable along the outer circumference of a guide unit 18 and provided for stable mounting of the head 34. The first guide roller 22, which is movable in the first guide surface 24, is formed here as a double of the first guide roller 58. Unlike the gripping and support element 4 of the embodiment of FIG. 7, the gripping and support element 4 of the exemplary embodiment of FIG. 8 has only one guide bar 44, which is not mounted by a cage but rather on casters 64 (FIG. 10). The guide bar 44 is connected with the base element 32 via a reversibly elastically deformable element 60, here a spring 62. The reversibly elastically deformable element 60 or spring 62 supports a return movement of the gripping and support element 4 when the first guide roller 22 and the second guide roller 23 are guided in their respective guide surfaces 22 or 23. The reference S additionally refers to the pivot axis of the gripping and support element 4.

Figure 9:
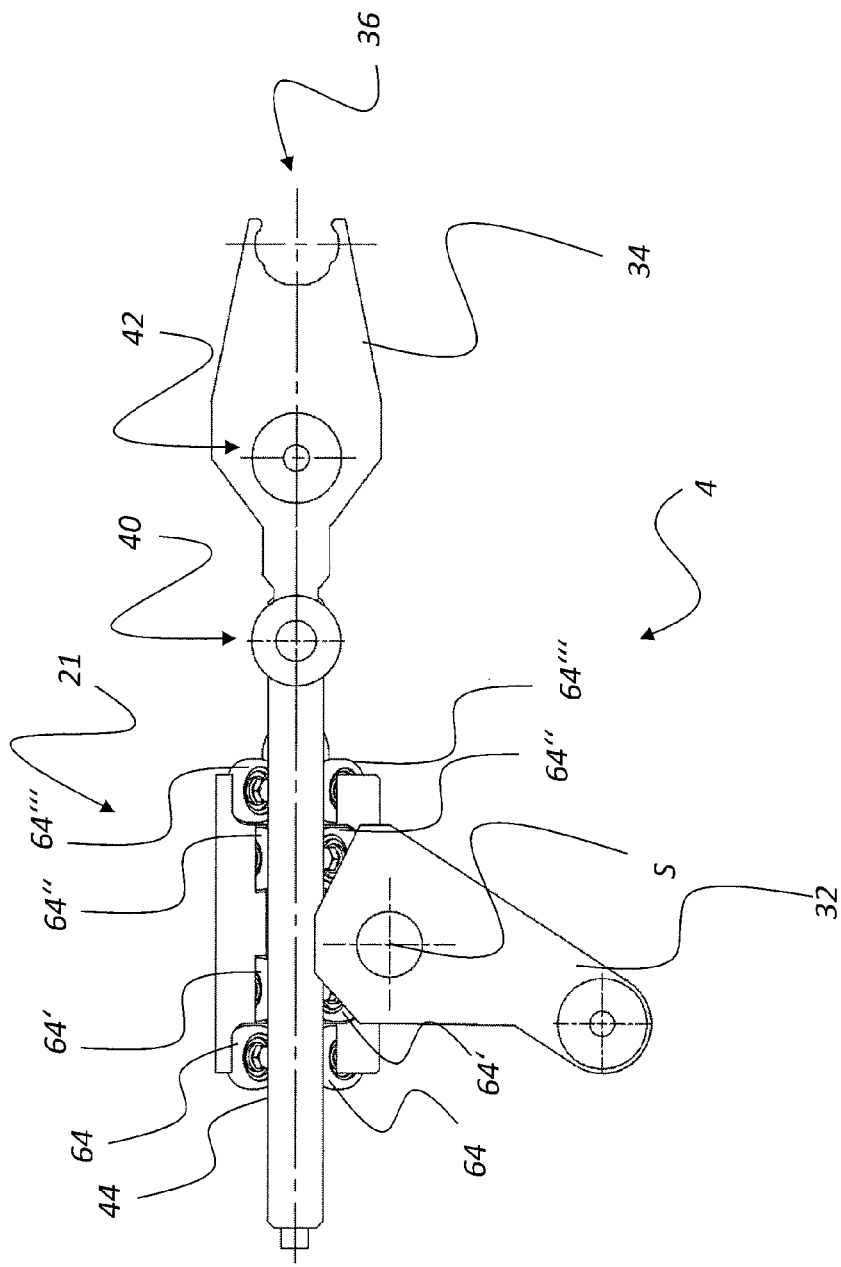
FIG. 9 shows a schematic top view of the gripping and support element shown in FIG. 8.

FIG. 9 shows a schematic top view of the gripping and support element 4 shown in FIG. 8. Additionally shown are the head 34 and the base element 32. The linear guide 21 consists of the base element 32, the guide bar 44, and four pairs of casters 64, 64', 64", and 64'". Two casters 64, 64', 64", 64'", are respectively in contact with the guide bar 44 on opposite sides. The casters 64, 64', 64", and 64'" hold the guide bar 44 and guide it in a linear fashion relative to the base element 32 during raising and return movements of the gripping and support element 4.

Compared with the embodiment shown in FIGS. 6 and 7, the configuration of the linear guide 21 of the embodiment shown in FIGS. 8 to 10 has the disadvantage of less stable guidance. The casters 64, 64', 64", and 64''' may preferably have suitable lubricant-free grooved ball bearings and a race applied with plastic or other materials.

FIG. 10 shows two schematic cross-sections of the embodiment of a gripping and support element 4 shown in FIG. 8 along intersection lines D and E. The cross-section through the intersection line D shows that the casters 64" of the caster pair each have contact surfaces with the guide bar 44 running parallel to one another. The cross-section through the intersection line E shows that the casters 64" of the caster pair also each have contact surfaces, which are substantially perpendicular to the contact surfaces of the casters 64". By orienting the casters 64" and 64''' with their contact surfaces, the guide bar 44 is held by the casters 64" and 64''' in a linearly movable fashion.

Figure 11:
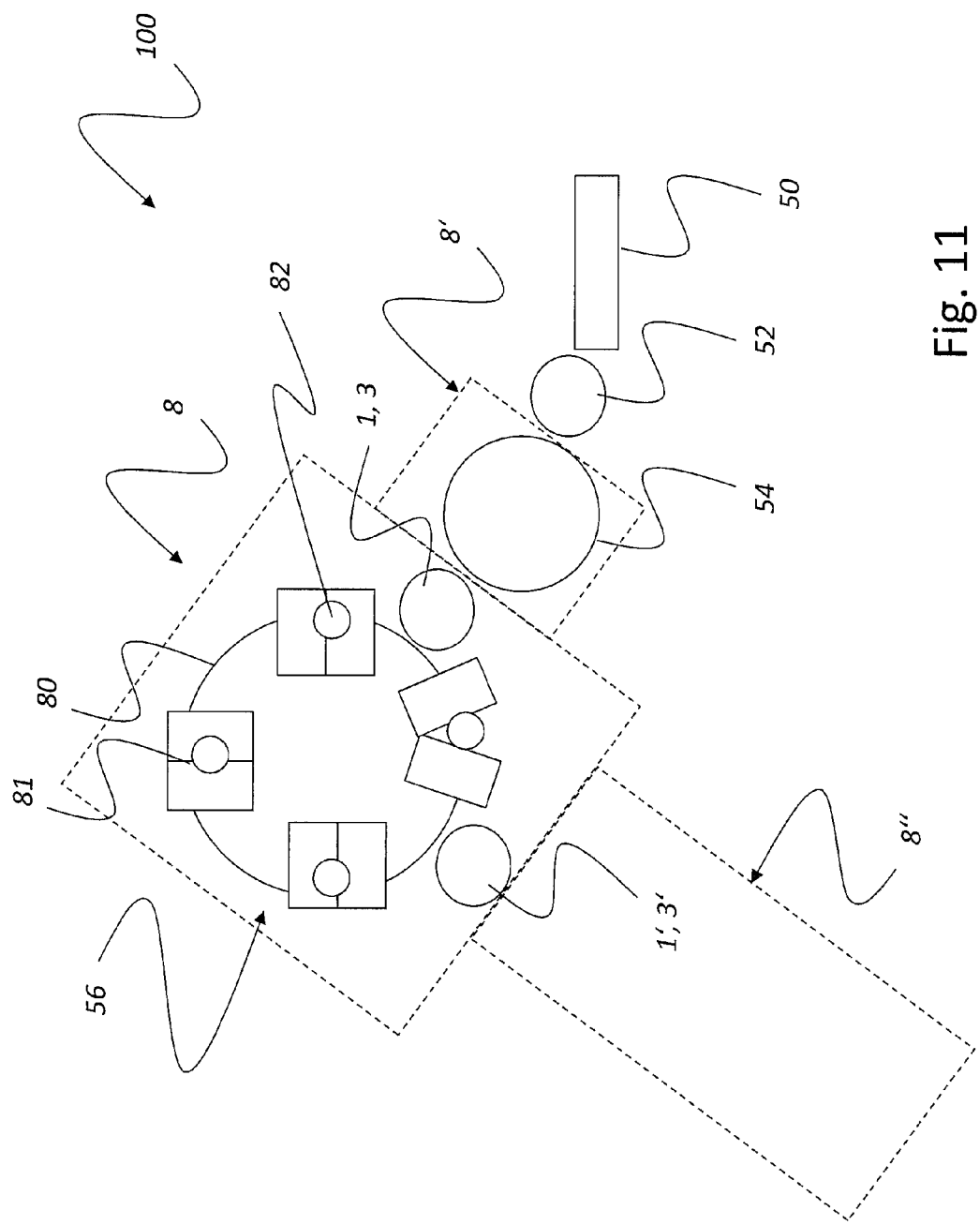
FIG. 11 shows a schematic representation of a possible configuration of the transport device according to the invention in a production process. Additionally.

FIG. 11 shows a device for reshaping preforms into plastic containers according to the invention and a possible arrangement of a transport device 1 according to the invention in this device. Shown is an oven 50 by which preforms are heat-treated. After passing through the oven 50, the heat-treated preforms are moved on to a sterilisation station 54 by means of a transfer system 52.

Also shown is a first transport device 1 and a second transport device 1', each comprising a joint clean room 8. Both the transport device 1 and the transport device 1' each have a support 17 with at least two gripping and support elements 4. The support 17 of the first transport device 1 and the support 17 of the second transport device 1' are arranged entirely within the clean room 8. Additionally, the gripping and support elements 4 of the first transport device 1 and the gripping and support elements 4 of the second transport device 1' are arranged entirely within the clean room 8. The clean room 8 may begin at the sterilisation station, preferably between the sterilisation station 54 and the transfer system 52. This is indicated by 8'. Although it need not be sterilised in this case, the transfer system 52 may be designed in the same manner as the transport devices 1, 1'.

If the sterilisation is carried out in the oven or a terminal area of the oven, the transfer system 52 and the steriliser 54 may be omitted. In this case, hygienic conditions would be present already in the oven or immediately thereafter (not shown). 'Hygienic conditions' may refer to treatment of the opening of the preform with sterile air.

After passing through the sterilisation station 54, the preforms are received by the first transport device 1, which is formed as a reducing starwheel 3, and transferred to a downstream stretch blower 56. The blow moulds 81 of the stretch blower 56 that are arranged on the blowing wheel 80 are also arranged here in the clean room 8. The clean room in the area of the blowing wheel is embodied, in particular, in an annular shape, i.e., one rotational axis of the blowing wheel is arranged outside of the clean room (not shown).

Blow nozzles 82 sealing the preform off from the environment and introducing sterile pressurised air into the preform, such that it is expanded against the walls of the blow mould 81, are also shown moving along with the blow moulds.

In a cleaning mode, gaseous $H_2O_2$ is guided through the airways of the blower (rotary distributor, valve blocks, pressure reducer [not shown]) and finally exits from the blow nozzles 82 into the clean room 8. Upon arriving, the gas is distributed in the clean room, and sterilises the inner surfaces of the clean room 8, which have already been heated with hot air. During this process, the transport stars 1, 1' and the blowing wheel 80 are continuously rotated. By the rotation of the transport stars 1, 1', the linear guides 21 are also actuated, resulting in $H_2O_2$ flowing through the bearings and sterilising them.

After passing through the stretch blower 56, the containers 2 stretch-blown from the preforms are received by the second transport device 1', which is also formed as a reducing starwheel 3'.

If applicable, the stretch-blown containers 2 may be moved on from the second transport device 1' to subsequent stations, e.g., a filling and/or sealing station. These are arranged in a continuation of the clean room 8'''. However, it is also possible for one or more stations downstream of the second transport device 1' or the reducing starwheel 3' to be arranged within the clean room 8. Different pressure may be applied to the clean rooms 8, 8', 8", whereby the pressure in the filling area 8''' is preferably the highest. To this end, sterile air is blown into the individual clean rooms 8, 8', 8" with different volume flows. It would also be conceivable for a uniform positive pressure to be established in all clean rooms 8, 8', 8".

FIGS. 12a and 12b show two modes of the linear guide 21 according to the invention. FIG. 2a shows an advanced position of the linear bearing 21, in which the distance between the gripping element 4 (only suggested) and the base element 32 is relatively large. The linear bearing 21 has a rail 73 that is configured to be movable relative to the base element 32. On the base, a guide 74 is arranged that is connected with the base element 32 preferably by means of a press fit—alternatively, it may be inserted into the base element 32 by means of a clearance fit and secured relative to the base element 32 in the longitudinal direction L of the bearing 21 by means of retaining rings. The relative mobility between the guide 74 or the base element 32 and the rail 73 allows for a cage 71, in which a plurality of roller bodies 72 is inserted via holes, whereby the roller bodies 72 roll both on the rail 73 and on the guide 74. The roller bodies 72 rotate in the holes, but do not execute any translative movement relative to the cage 71. The roller bodies 72 in this case are stainless steel spheres 72, but barrel- or needle-shaped roller bodies, or other shapes, are also possible. The rail 73 is embodied substantially cylindrically. The guide 74 and the cage 71 are arranged coaxially with the rail 73, and each formed as a hollow cylinder. In the longitudinal direction L, a stop 75, 75' is arranged on each end of the cage 71, setting a certain amount of play for the cage relative to the guide 74. Depending on the embodiment, the length of the guide 75 in the longitudinal direction L may range from one third to two thirds of the distance between the two stops 75, 75' in the longitudinal direction L or the length of the rail 73. In this case, the length is approximately one half the distance between the stops 75, 75' or the rail 73.

Because the guide 74 is shorter in the longitudinal direction L of the bearing than the cage 71, the roller bodies 72 and the terminal areas of the cage 71 are regularly exposed. The exposed areas are marked d' on the area facing away from the gripper 4 and marked d on the area facing the gripper 4. This allows for very good sterilisation of these areas.

FIG. 12b shows a retracted position of the linear bearing of FIG. 12a. The distance traversed by the gripper 4 relative to the base element 32 is substantially twice as large as the distance traversed by the cage relative to the base element. By changing the position, the exposed areas have changed. d' is now larger and is as long as d". The length of the area d has decreased to d'''.

Thus, other areas are exposed compared to the previous position (FIG. 12a).

If, during movement in a sterilisation gas atmosphere, the individual components 71, 74, 73 of the bearing move relative to one another, all areas are highly accessible. The movement is obtained by constant rotation of the star. By rotating the star, sterilisation gas is introduced both between the cage 71 and the guide 74 and between the cage 71 and the rail 73. To this end, clearance is provided between each of the three parts. Between the roller bodies 72, clearance is also provided in a circumferential direction of the cage 71, through which sterilisation gas can flow. In this way, not only the inside and outside of the cage 71 are sterilised, but also the surface of the rail 73 and the inner surface of the guide 74. D refers to the thickness of the cage 71. D' refers to the distance of the inner surface of the guide 74 from the outer surface of the rail 73.

However, these exposed areas d are not only highly accessible during sterilisation; they are also accessible, e.g., during manual or automatic cleaning. During manual cleaning, the operator may jog the star 1, 3, thus manually cleaning the various areas d of the cage 71, one after another.

It is particularly advantageous for the cage 71 to be exactly or slightly more than twice as long as the guide 74. Thus, the entire surface of the cage 71 is exposed during sterilisation.

Figure 13:
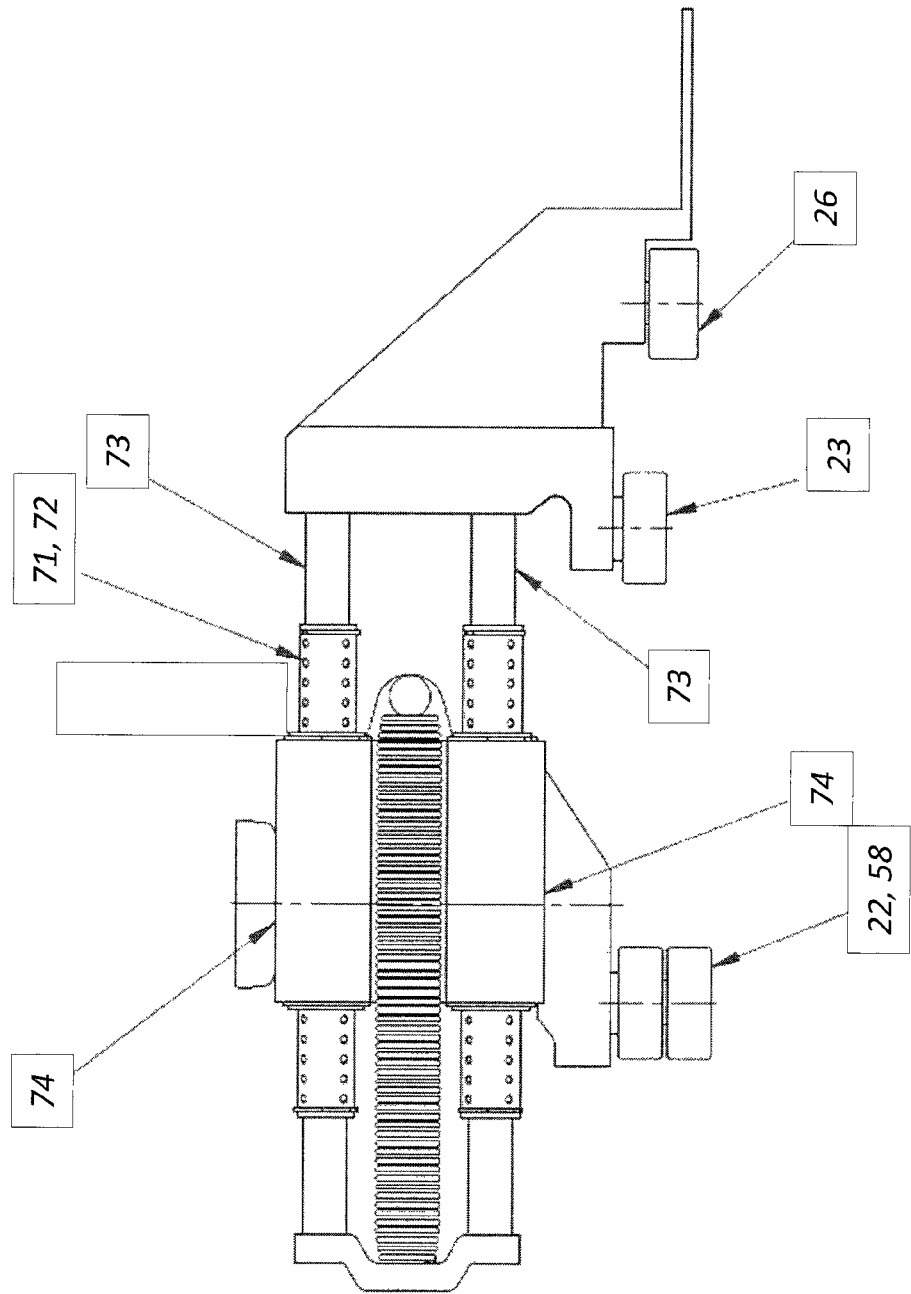
FIG. 13 shows an embodiment with two linear guides.

FIG. 13 shows an embodiment with two linear guides. In this way, an even greater degree of stability and fatigue strength is obtained. Additionally, the dual mount prevents tipping when round linear bearings are used. For space efficiency, the two bearings are arranged one on top of the other, such that, in addition to this transfer arm, there will also be space for many more transfer arms in the transport device in their circumferential direction.

The invention was described by referring to a preferred embodiment. However, one skilled in the art will be aware that variations and modifications of the invention can be made without departing from the scope of the claims below.

REFERENCE NUMERALS

1 Transport device
2 Plastic container
3 Reducing starwheel
4 Gripping and support element
5 Motor drive
6 Standing leg
7 Support structure
8 Clean room
9 Wall section
10 Cantilever arm
12 Fluid seal system
13 Entrance
14 Exit
15 Drive shaft
17 Support
18 Guide unit
19 Flange section
20 Screw connection
21 Linear guide, linear bearing
22 First guide roller
23 Second guide roller
24 First guide surface
25 Second guide surface
26 Cam roller
27 Support system
28 First column section
29 Second column section
30 Flange section
32 Base element
34 Head
36 Receiving position
38 First attachment area
40 Second attachment area
42 Third attachment area
44, Guide bar
44'
46 Mount area
48 Clamp-shaped section
50 Oven, heater, tempering device
52 Transfer unit
54 Sterilisation station
56 Stretch blower
58 Doubled first guide roller
60 Reversibly elastically deformable element
62 Spring
64 Casters
71 Cage
72 Spheres, roller bodies
73 Rail
74 Guide
75 Stop
80 Blowing wheel
81 Blow mould
82 Blow nozzle
100 Device for reshaping preforms into plastic containers
A Outside
F Bottle
I Inside
S Pivot axis
d Exposed cage section
D Sphere thickness
L Longitudinal direction of the linear bearing

The invention claimed is:

1. A device (100) for reshaping preforms into plastic containers (2) having at least two blow moulds (81) in which the preforms are expanded into plastic containers, which are arranged on a circumferentially driven blowing wheel (80), a heater (50) for heating the preforms, and a transport device (1) for the plastic containers (2) or preforms, said transport device (1) comprising:
a motor drive (5) with a drive shaft (15) that drives a support (17), with at least two gripping and/or support elements (4) for the respective plastic containers (2) or preforms to be transported, in a rotating fashion, wherein the gripping and/or support elements (4) are mounted with a linear bearing (21) so as to be movable relative to the support; characterised in that the linear bearing has at least one rail, which is surrounded at least in sections by a cage (71), and that a plurality of rollers (72), which roll on the rail (73), is arranged in the cage (71).

2. The device according to claim 1, comprising at least one substantially closed clean room (8), in which said at least two blow moulds, the support (17), the linear bearing (21), and said at least two gripping and/or support elements (4) are completely received.

3. The device according to claim 1, wherein the cage is arranged at least in sections within a guide (74), which surrounds at least sections of the cage (71), and wherein the rollers roll on the guide.

4. The device according to claim 3, wherein the length of the cage (71) in a longitudinal direction (L) of the linear bearing (21) is longer than the guide (74) and/or the rail (73), and thus areas of the cage (d, d', d'', d''') are at least occasionally exposed, and these areas (d, d', d'', d''') are accessible for sterilisation and/or cleaning.

5. The device according claim 1, wherein a distance of an outer side of the cage (71) from the guide (74) and/or an inner side of the cage (71) from the rail (73) is greater than one twentieth of the distance (D') from the inner side of the guide (74) to the outer side of the rail (73).

6. The device according to claim 1, wherein a distance (D) of the outer side of the cage (71) from the inner side of the cage (71) is at least one tenth, preferably at least one fifth, of the distance (D') from the inner side of the guide (74) to the outer side of the rail (73).

7. The device according to claim 1, wherein the linear bearing (21) is formed without lubricants, wherein the cage (71) consists of a material that is PEEK, which is resistant to sterilising agents, in particular $H_2O_2$, and both the rail (73) and the guide (74) are made of stainless steel or a coated steel, the surface of which is resistant to the sterilising agent, in particular $H_2O_2$.

8. The device according to claim 1, wherein, in the longitudinal direction (L) of the linear bearing (21), a stop (75, 75') for the guide (74) is arranged on at least one end, preferably both ends, of the cage (71).

9. The device according claim 1, wherein the cage (71) is formed as a cylindrical sleeve, in which a plurality of holes, the longitudinal axes of which are arranged substantially perpendicular to a central axis of the linear bearing (21), is located both along the longitudinal direction (L) and the circumferential direction, and wherein, in particular stainless steel or ceramic, spheres are arranged as rollers (72) in the holes.

10. The device according to claim 1, wherein at least two linear bearings (21), in particular having cylindrical rails (73), are provided for each gripping and/or support element (4) to mount the gripping and/or support element (4).

11. The device according to claim 1, wherein a valve is provided that is arranged between a reservoir with sterilisation and/or cleaning agent and the clean room (8), and which can be opened to let in the sterilisation and/or cleaning agent, and wherein a controller is designed such that at least substantially simultaneously the transport device (1) is driven in a rotating fashion via the drive (5) and the valve is kept open.

12. A transport device (1) for use in a device for reshaping preforms to plastic containers (2), comprising a motor drive (5) with a drive shaft (15) that drives a support (17), with at least two gripping and/or support elements (4) for the respective plastic containers (2) or preforms to be transported, in a rotating fashion, wherein the gripping and/or support elements (4) are mounted with a linear bearing (21) so as to be movable relative to the support (17), characterised in that the linear bearing (21) has at least one rail (73), which is surrounded at least in sections by a cage (71), and that a plurality of rollers (72), which roll on the rail (73), is arranged in the cage (71).

* * * * *